June 27, 1967 B. HIKES 3,327,867
SCUM SKIMMER FOR A LIQUID CLARIFIER
Filed April 15, 1965 3 Sheets-Sheet 1

Inventor:
Burd Hikes,
By Hume Groen Clement & Hume
Attys.

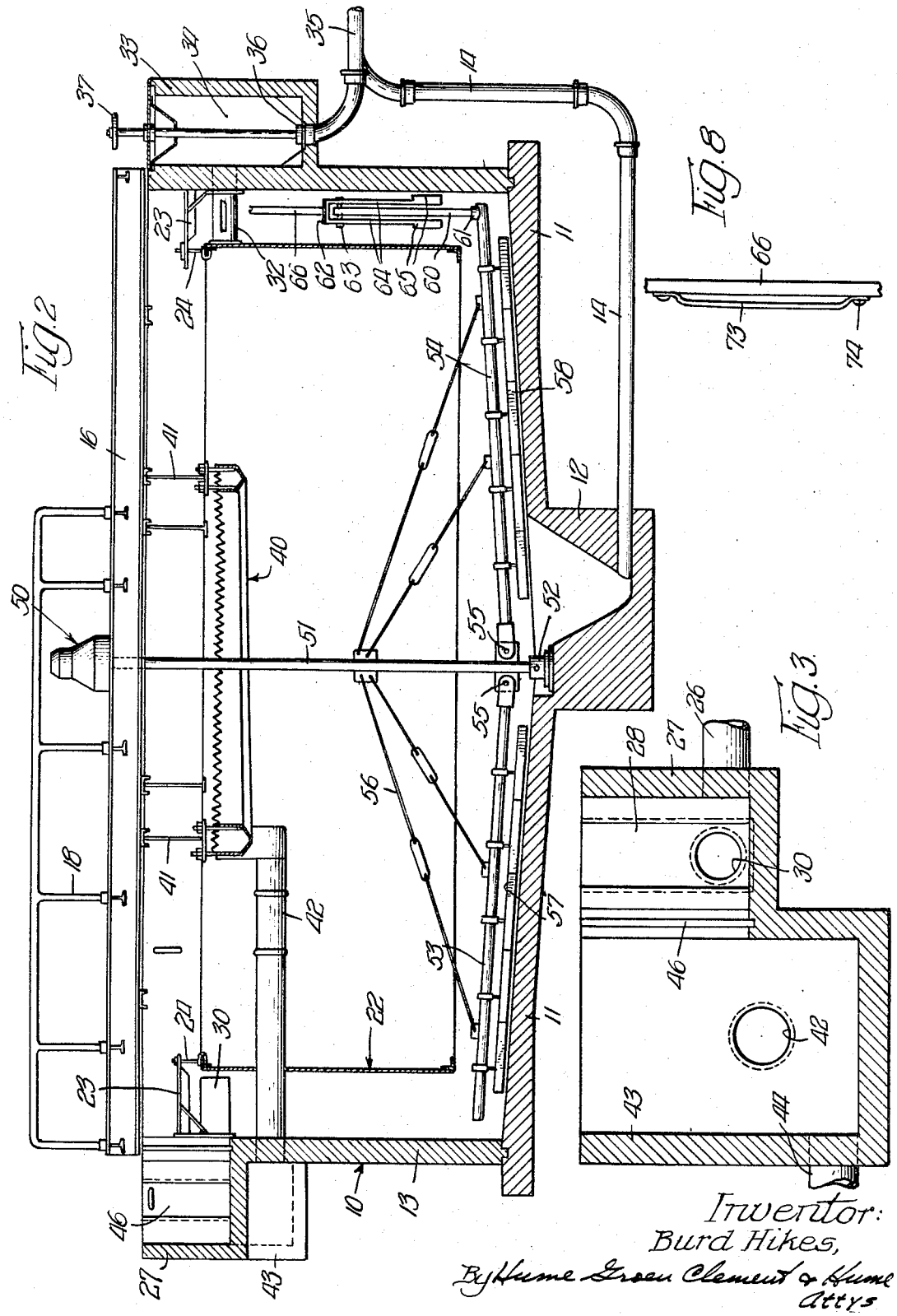

June 27, 1967 B. HIKES 3,327,867
SCUM SKIMMER FOR A LIQUID CLARIFIER
Filed April 15, 1965 3 Sheets-Sheet 3

Inventor:
Burd Hikes,
By Hume Groen Clement & Hume
Attys.

United States Patent Office 3,327,867
Patented June 27, 1967

3,327,867
SCUM SKIMMER FOR A LIQUID CLARIFIER
Burd Hikes, Wilmette, Ill., assignor to Lakeside Engineering Corporation, Chicago, Ill., a corporation of Illinois
Filed Apr. 15, 1965, Ser. No. 448,395
1 Claim. (Cl. 210—525)

The invention relates to settling tanks for clarifying liquids such as slurries, sewage and industrial wastes and has reference, more particularly, to improved means for removing the floating scum from the peripheral race of the settling tanks.

In the sedimentation and clarification tanks to which the invention applies, the incoming liquid is discharged tangentially within the peripheral race. This promotes flow of the liquid around the tank as the liquid also flows downwardly to the sedimentation chamber. Within the clarifying chamber there is located a launder for decanting the clear liquid and below the launder and in contact with the base of the tank, the conventional scraper arms are provided for progressively moving the sludge to the sludge outlet.

A primary object of the invention is to provide a scum skimmer which will be attached to the rotating scraper arms so as to have movement therewith for moving the floating scum on the surface of the liquid within the peripheral race to the scum outlet pipe.

Another and more specific object is to provide a scum skimmer for the purposes described which will be attached for movement to the rotating scraper arms or to the scraper drive and which will have a velocity low enough to minimize scouring of the solids on the floor and also low enough to minimize any undesirable turbulent action in the settling zone within the circular skirt.

A further object resides in the provision of a scum skimmer for a liquid clarifier for moving the floating scum within the peripheral race to the scum outlet and which will be so constructed and arranged that the device will be able to pass under pipes, conduits and other obstructions such as may be encountered during movement within the peripheral race.

With these and various other objects in view, the invention may consists of certain novel features of construction and operation as will be more fully described and particularly pointed out in the specification, drawings and claims appended thereto.

In the drawings which illustrate an embodiment of the device and wherein like reference characters are used to designate like parts:

FIGURE 2 is a vertical sectional view of the clarifying tank taken substantially along line 2—2 of FIGURE 1;

FIGURE 3 is a fragmentary sectional view taken substantially along line 3—3 of FIGURE 1;

FIGURE 8 is a fragmentary detail view illustrating a type of bumper guard which may be applied to the present scum skimmer.

Figure 1:
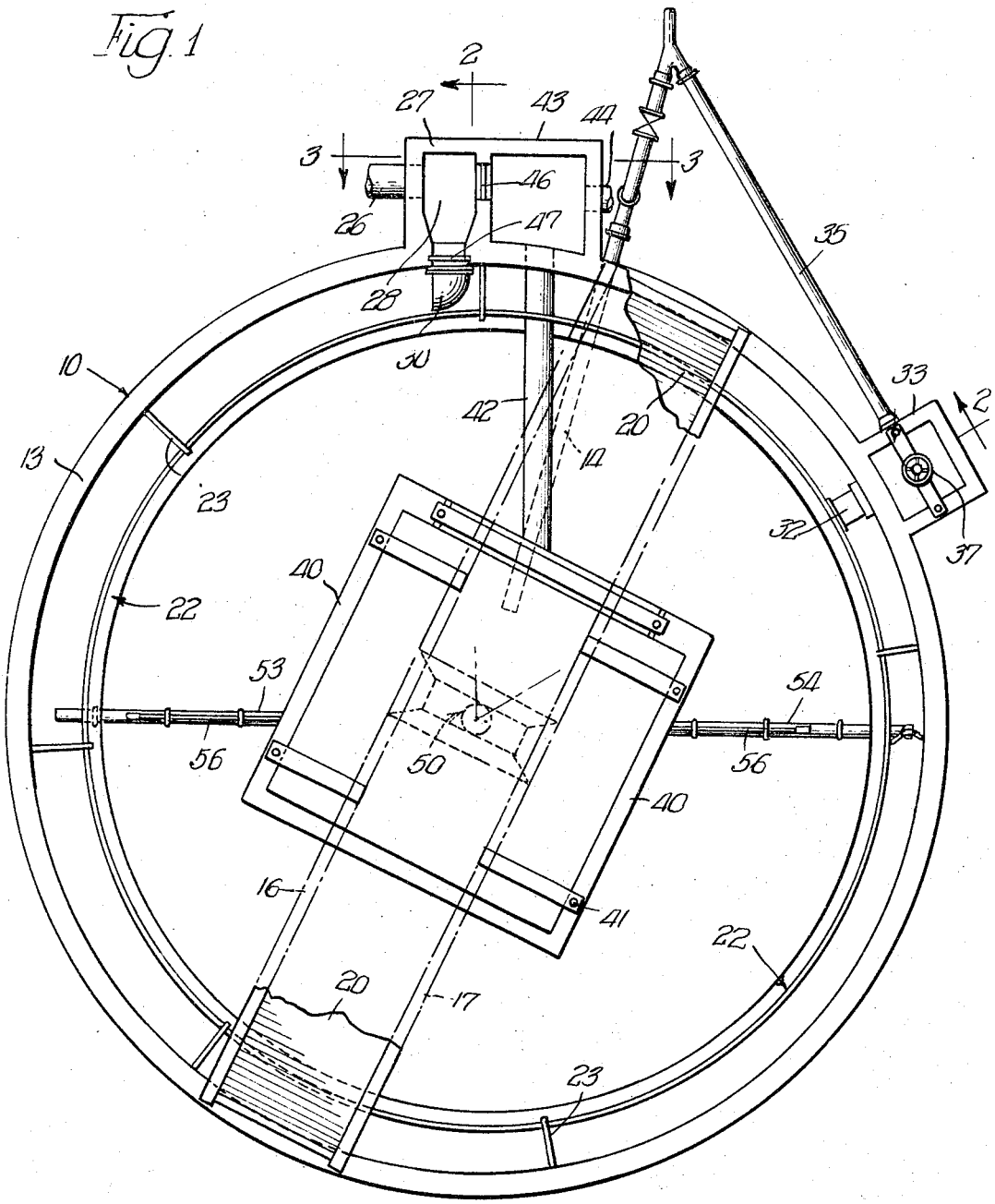
FIGURE 1 is a top plan view of a clarifying tank having a depending skirt to form settling and clarifying chambers and which incorporates the novel and improved scum skimmer of the invention.

Referring to the drawings and particularly to FIGURES 1 and 2, the numeral 10 indicates a tank or settling basin which may be circular, square or hexagonal and which may be formed of concrete, wood, steel or the like, the tank having a conical bottom 11, and a centrally located sludge discharge portion 12. The circular wall 13 of the tank extends upwardly from the conical bottom wall 11, and said wall 13 supports the superstructure and other equipment of the present tank. The bottom of the tank connects with the centrally located sludge discharge portion 12 having the sludge draw-off pipe 14. The superstructure supported by the tank includes the diametrically extending beams 16 and 17 and which provide a wall 20 across the top of the tank. The walk includes the guard rails 18 which have location on and extend upwardly from the beams 16 and 17.

The interior of the present tank is divided into compartments or chambers by means of a depending skirt identified by numeral 22. The radially extending supports 23 are suitably secured to the wall 13 and the depending skirt 22 is in turn secured to said supports by means of the rods 24. The depending skirt is positioned within the tank in spaced relation with the wall 13 to provide an annular chamber which will be referred to as the peripheral race, and to which the incoming liquid is delivered. It will also be observed that the depending skirt 22 terminates short of the bottom wall 11 so that the tank is divided centrally thereof into two compartments or chambers, one within the annular skirt from which the clarified liquid is withdrawn and the other comprising the sludge chamber below the skirt from which the sludge is removed by means of the sludge draw-off pipe 14.

The raw liquid for processing, such as water, industrial wastes, sewage and the like is delivered to the tank by means of the supply pipe 26 having connection with the inlet box 27. The inlet box is preferably constructed of concrete and the same is generally formed integral with the wall 13 of the tank. From the well 28 of the inlet box 27 the incoming raw liquid is conducted to the annular race by means of the influent deflector 30 which is located at about the liquid level and which functions to discharge the liquid tangentially so as to cause flow of the same around the peripheral race and downwardly in order to pass under the depending skirt and into the contiguous, centrally located clarifying chamber. Any material in the incoming liquid which is too light to settle will remain on the surface of the liquid within the peripheral race, and means are provided by the invention for moving the floating material within the peripheral race to a scum outlet pipe 32. The scum outlet pipe 32 discharges into an outlet box such as 33, the same being preferably formed of concrete integral with the wall 13 of the tank and located on the exterior surface thereof so as to project radially outward from the wall. Each outlet box 33 is provided with a well 34 and from said well the liquid and scum discharged from the scum outlet pipe is, in turn, delivered to a discharge pipe 35. The gate 36 actuated by the hand wheel 37 controls flow of the liquid and scum from the well to the discharge pipe.

Within the clarifying chamber the liquid travels upwardly to the launder 40. The launder is suitably suspended from the beams 16 and 17 by means of the connecting rods 41. The clear liquid which overflows the sides of the launder is collected by the same and discharged from the tank by the effluent pipe 42 connecting therewith. It will be observed that the effluent pipe passes through the depending skirt 22 and into and through the peripheral race and through wall 13 of the tank to connect with the clarified liquid outlet box 43. The said box is also formed of concrete and is preferably integral with the tank and with the inlet box 27. The effluent discharge pipe 44 is connected to box 43 and it will be observed that a gate 46 is located between the inlet box 27 and the outlet box 43. It is possible by opening the gate to recirculate the effluent. Provision is also made for a gate 47 in the event it is desired to control flow of the incoming liquid to the influent deflector 30. The effluent pipe 42 is located near the end of the annular race considering the direction of movement of the liquid therein and such a location helps to minimize any turbulence caused by the pipe and any interference with flow of liquid around the race.

The rods 41 which suspend the launder 40 from the beams 16 and 17 are adjustable as regards their length so that the position of the launder vertically of the clarifying chamber can also be adjusted. It is also desirable to notch the top edge of the launder to provide wiers over which the liquid will flow.

The beams 16 and 17 provide the support for the motor and speed reducing mechanism indicated in its entirety by numeral 50 and which is supported by said structure centrally of the tank. The drive shaft 51 depends downwardly from the motor mechanism and terminates adjacent the bottom 11 of the tank, the terminal end of the shaft 51 being journalled and positioned by the bearing member 52 supported on the portion 12. Two oppositely extending inclined scraper arms 53 and 54 are suitably supported at 55 adjacent the terminal end of shaft 51 and additional supporting means for the scraper arms consists of the tie rods 56. Each scraper arm essentially includes a metal pipe or similar structural element which is pivoted at 55 to the shaft 51 and braced by the tie rods 56. The plows or scrapers 57 and 58 are secured in depending relation to the metal pipes 53 and 54, respectively, and as the structure is caused to revolve the scrapers propel the sludge and other material from the bottom of the tank into the pocket provided by the portion 12 for discharge. The scrapers may be disposed at an angle to the direction of rotation for the most efficient operation in propelling and delivering the sludge to the pocket for eventual discharge by means of the sludge draw-off pipe 14.

Figure 4:
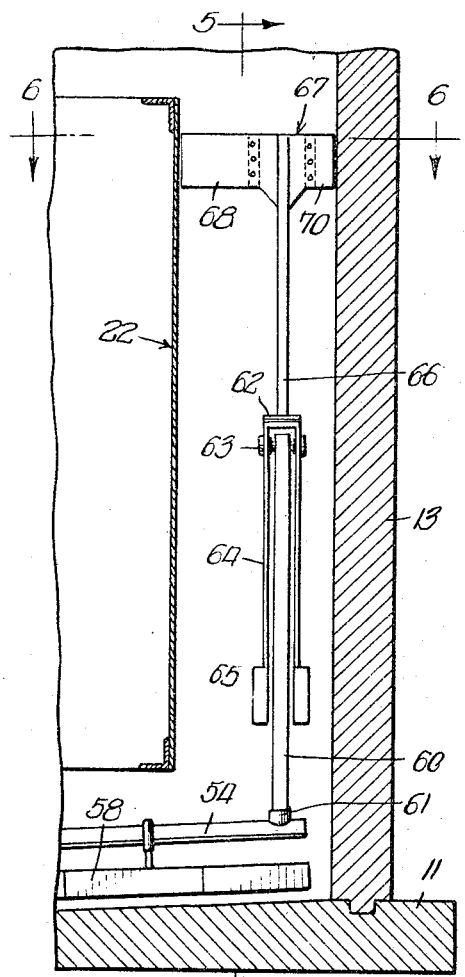
FIGURE 4 is a fragmentary enlarged sectional view taken vertically of the peripheral race of the clarifying tank and showing the scum skimmer of the invention.
Figure 5:
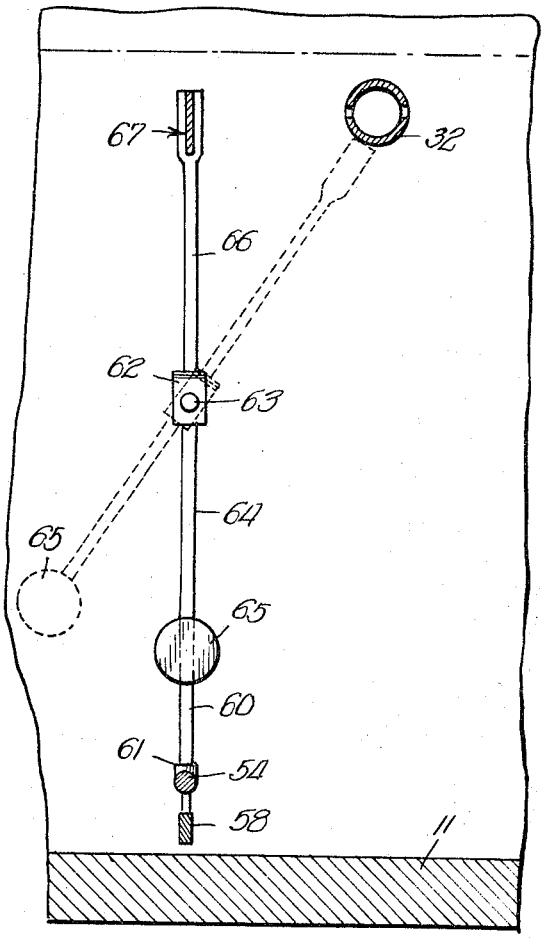
FIGURE 5 is a sectional view taken along line 5—5 of FIGURE 4.
Figure 6:
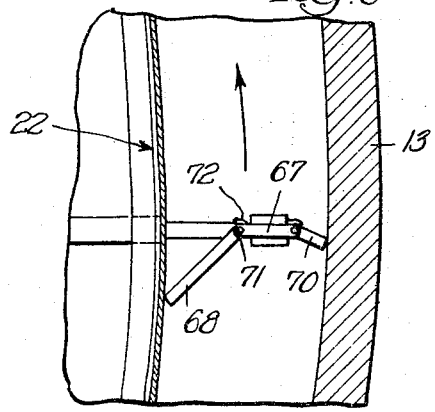
FIGURE 6 is a sectional view taken substantially along line 6—6 of FIGURE 4 showing the scum skimmer located within a narrow part of the peripheral race.
Figure 7:
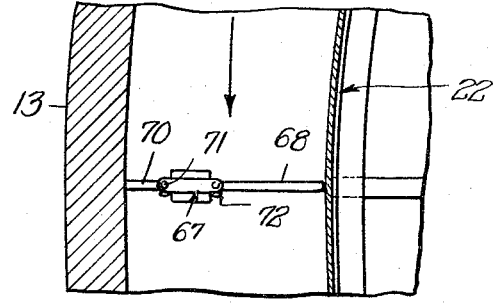
FIGURE 7 is a view similar to FIGURE 6 but showing the scum skimmer in a wide part of the peripheral race.

The scum skimmer of the invention is fixed to and has movement with the scraper arms. As best shown in FIGURES 4 and 5 each device essentially includes an upright support 60 suitably fixed at 61 to the scraper arms 53 and 54, respectively. At the upper end of the upright support 60 a yoke member 62 is suitably pivoted thereto at 63, the said yoke member providing depending arms 64 which carry the counterbalancing weights 65 at their lower terminal ends. The support 66 is fixed to the yoke member 62 so as to extend upwardly therefrom and said support 66 at its upper terminal end carries the blades of the scum skimmer 67. Since the scum skimmer travels the complete path of the peripheral race which in most installations of clarifying tanks will vary in width, it is necessary to provide pivoted blades or flexible blades which will blend in those portions of the peripheral race which are narrow and will fully project when passing through those portions of the peripheral race which are wider. This feature of the invention is shown in FIGURES 6 and 7 wherein the scum skimmer 67 is illustrated as including pivoted blades 68 and 70 which have a pivotal connection 71 with the central body portion of the scum skimmer. When the blades are pivoted as shown, coil springs 72 or the like are associated therewith in order to yieldingly urge the blades into the fully extended position as shown in FIGURE 7. Accordingly, when the scum skimmer is passing through a narrow portion of the peripheral race, it is possible for the blades to pivot against the tension of the spring 72 without damaging the blades or the skimmer in any respect. At the same time the scum skimmer accommodates itself to the variable widths which are encountered in moving around the peripheral race. It is, of course, possible to eliminate the pivoted blade structure and substitute in its place a one piece vane or blade of flexible material such as rubber, metal, plastic or the like and which will accordingly perform in a manner as explained with respect to the variable widths in the peripheral race.

As the scum skimmer moves around the peripheral race due to the rotative action of the scraper arms, the support 66 of the skimmer will contact various obstructions in the race, such as the effluent pipe 42 and the scum outlet pipe 32. Provision must be made so that the device may have a deflecting or pivotal movement for passing under these obstructions. Accordingly, the yoke 62 as shown in FIGURES 4 and 5 is pivoted at 63 to the upright support 60. The weights 65 provide the necessary counterbalancing means for normally maintaining the support 66 and the scum skimmer 67 in a substantially vertical upright position. However, as the obstructions are encountered by the scum skimmer device pivoting action at 63 takes place so that the device can pass under the obstructions without damage to any of the parts of either the scum skimmer or the tank.

FIGURE 8 illustrates a preferred method of protecting the support 66 and the scum skimmer 67 from damage when the obstructions are encountered. The protection includes a bumper guard 73 fixed at 74 to the support 66. The bumper guard 73 is preferably located on the support at those locations where contact is had with the obstructions. It is, of course, possible to extend the bumper guard to also include the scum skimmer so that the desired protection would also be provided for this element.

The invention is not to be limited to or by details of construction of the particular embodiment thereof illustrated by the drawings as various other forms of the device will, of course, be apparent to those skilled in the art without departing from the spirit of the invention or the scope of the claim.

What is claimed is:

In a settling device, in combination, a generally circular tank having a vertical cylindrical wall and a substantially horizontal bottom wall, a circular skirt depending within the tank in spaced eccentric relation with the cylindrical wall, said skirt terminating short of the bottom wall whereby the skirt divides the tank into a peripheral race around the skirt and into a centrally disposed clarifying chamber within the skirt, an inlet conduit for supplying incoming liquid to the peripheral race, a scum outlet pipe in the peripheral race disposed transversely thereof at approximately the liquid level, a vertical drive shaft depending centrally of the clarifying chamber, diametrically disposed scraper arms fixed to the drive shaft for rotation with the said shaft, the terminal ends of said arms extending under the skirt and below the peripheral race, a scum skimmer fixed to the terminal end of one of said scraper arms and projecting vertically upward into the peripheral race, said scum skimmer including a base support which is fixed to the scraper arm, a yoke member pivoted to the upper end of the base support and providing a supporting element extending to the liquid level in the peripheral race, a blade member fixed to the pivoted supporting element at the liquid level, means for counterbalancing the pivoted supporting element to normally maintain the element and said blade member in a vertical position, said counterbalancing means permitting the supporting element to pivot so as to pass under the scum outlet pipe which forms an obstruction in the path of the same, and at least one laterally extending vane pivoted to the body portion of the blade member on a substantially vertical axis, whereby the blade member including the laterally extending pivoted vane is able to accommodate itself when passing through the narrow part of the peripheral race while being fully extended when passing through the wide part of the race.

References Cited

UNITED STATES PATENTS

| | | | |
|---|---|---|---|
| 2,611,489 | 9/1952 | Scott | 210—528 |
| 2,681,151 | 6/1954 | Coulter | 210—528 |
| 2,798,041 | 7/1957 | Thompson et al. | 210—512 X |

REUBEN FRIEDMAN, *Primary Examiner.*

J. DeCESARE, *Assistant Examiner.*